Aug. 21, 1962  A. P. DHUICQ  3,050,163
SEQUENTIAL CLUTCH AND DIFFERENTIAL CONTROL
Filed July 6, 1960
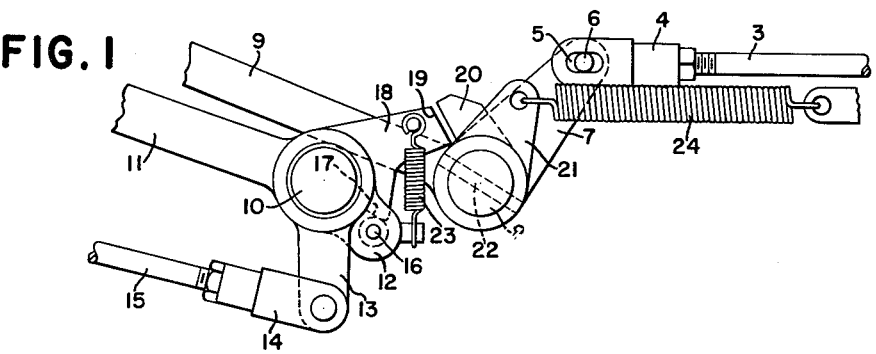
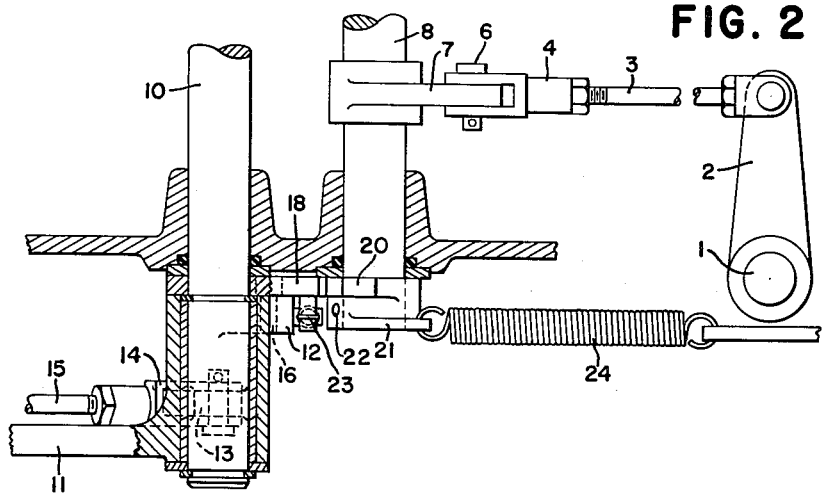
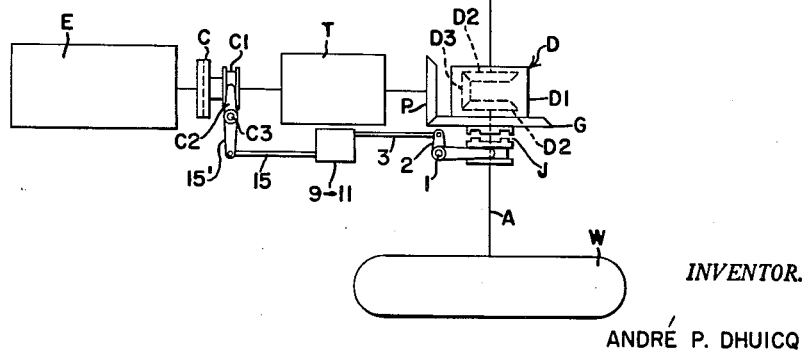
INVENTOR.
ANDRÉ P. DHUICQ

United States Patent Office 3,050,163
Patented Aug. 21, 1962

3,050,163
SEQUENTIAL CLUTCH AND DIFFERENTIAL CONTROL
André P. Dhuicq, Taverny-Seto, France, assignor to Deere & Company, Moline, Ill., a corporation of Delaware
Filed July 6, 1960, Ser. No. 41,133
Claims priority, application France July 8, 1959
3 Claims. (Cl. 192—3.5)

This invention relates to motor vehicles and more particularly to the coordination of the control of the clutch and differential in the motor vehicle power train.

The invention finds particular utility in agricultural and industrial tractors of the type provided with a selectively lockable and unlockable differential; that is, a differential in which normal differential action is obtainable but means is provided for locking the differential so that both traction wheels turn in unison under conditions in which one of the wheels would otherwise slip. Popular locking differentials of the manually controlled type usually resort to the use of a jaw or dog clutch for locking the differential in any suitable manner, such as by locking one of the axles to the differential carrier. Because of the nature of the clutch as a jaw clutch, damage to the differential can occur if the jaw clutch is engaged without previously disengaging the engine or master clutch.

According to the present invention, the controls for the master clutch and jaw clutch are coordinated so that the jaw clutch cannot be engaged to lock the differential unless the master clutch is first disengaged. It is a further feature of the invention to provide a control means coordination in which the master clutch may be re-engaged after the jaw clutch is engaged to lock the differential the control means being further so arranged that the jaw clutch may be disengaged without disengaging the master clutch. It is a further object of the invention to provide such means in the form of a simple and inexpensive arrangement that may be readily applied to vehicles already equipped with manually controlled lockable differentials.

The foregoing and other important objects and desirable features inherent in and encompassed by the invention will become apparent as a preferred embodiment thereof is disclosed by way of example, in the ensuing description and accompanying sheet of drawings, the figures of which are described below.

FIG. 1 is a fragmentary elevational view of the means for coordinating the controls.

FIG. 2 is a plan view partly in section, of the structure shown in FIG. 1.

FIG. 3 is a schematic view, illustrating a typical power train with the controls and the coordinating means therefor.

Reference will be had first to FIG. 3 for an orientation of the environment in which the invention finds particular utility. In that figure, the tractor is shown as having an internal combustion engine or other suitable power source E which, through a master clutch C, drives a typical change speed transmission T which in turn drives a pair of traction wheels W having axles A interconnected by a differential D. This differential may be of any suitable type including a carried D1, side gears D2 connected respectively to the axles A, one or more differential gears D3 and a driven gear G driven by a pinion P which is in turn driven by the transmission T.

The master or engine clutch C may be of any conventional friction type and is engaged and disengaged by a throw-out bearing C1 under control of an arm C2 on a rockshaft C3. If it be assumed that the differential D is of conventional construction, then the vehicle will be operated in the conventional manner, power being connected to and disconnected from the traction wheels W according to engagement and disengagement of the master clutch C.

In the present case, however, the differential is one of several of the lockable and unlockable types and in this case has a jaw clutch J which is operative to selectively connect and disconnect the axle A to and from the differential carrier D1. The jaw clutch J is shown in FIG. 3 in its disengaged position, in which the differential will perform in its conventional manner. When the jaw clutch J is connected, the differential is locked so that both axles, and consequently both wheels W, will turn in unison.

The jaw clutch J is under control of an arm mounted on a rockshaft 1 which has rigid thereon a second arm 2 which is in turn connected via a link 3 and clevis 4 to control mechanism which is also connected to the master clutch rockshaft C3, in a manner to be presently described.

The clevis 4 has therein a slot 5 for receiving a pin 6 which is carried by an arm 7 rigid on a rockshaft 8 which is under control of a pedal 9. A second rockshaft 10 is journalled in parallelism with the rockshaft 8, the two rockshafts being mounted in any suitable manner on the tractor. Rockshaft 10 is under control of a separate pedal 11. The pedal 9 is operative to lock and unlock the differential via the jaw clutch J, and the pedal 11 is operative to engage and disengage the engine clutch C. Rigid on the pedal 11 are a pair of arms 12 and 13, and the latter is connected via a clevis 14 to a link 15 which is in turn connected to the rockshaft C3 via an arm 15' so that depression of the pedal 11 causes disengagement of the master clutch C. The clutch C is of the type in which re-engagement thereof is effected by a suitable spring loading therewithin.

The arm 12 carries a pin 16 which is engaged by the beak 17 of a stop 18 which is rotatably mounted on the rockshaft 10 and which has a rear abutment edge 19 for cooperation with a second stop or lug 20 rigid on the rockshaft 8. The lug 20 may be part of an arm 21 which is pinned to the rockshaft 8 by a pin 22. Biasing means in the form of a coiled tension spring 23 is connected between the arm 12 on the rockshaft 10 and the stop 18, which is loose on the rockshaft so as to be swingable out of the position shown in FIG. 1. A second tension spring 24 operates between the arm 21 on the rockshaft 8 for biasing the rockshaft 8 in a clockwise direction so as to normally incur the disengaged condition of the jaw clutch J for the differential D.

In normal operation with the parts as shown in the drawings, the vehicle can be driven in the usual manner; that is, engagement and disengagement of the master clutch C controls the power transmission to the traction wheels W. The differential performs in the manner of a typical differential. However, should conditions be encountered in which one of the wheels slips and thereby causes loss of forward movement of the tractor, the jaw clutch J can be engaged so as to lock up the differential, whereby the two traction wheels W will turn in unison. In the absence of the coordinating mechanism provided by the invention, depression of the pedal 9 would normally effect engagement of the jaw clutch J, with the attendant disadvantages noted above, primarily those arising because of shock loads imposed on the differential. However, the pedal 9 cannot be depressed, because the stop or lug 20 on the rockshaft 8 will abut against the rear edge 19 of the stop 18 rotatably mounted on the rockshaft 10. This condition will obtain as long as the clutch C is engaged, which means that the clutch pedal 11 has not yet been depressed. Therefore, the only way to effect engagement of the jaw clutch J so as to lock the differential is to first depress the clutch pedal 11 to disengage the engine clutch C. When this is done, the stop or abutment 18 is cleared from the path of the lug 20 on the rockshaft 8 and the differential control clutch pedal 9 may now be depressed. Since the engine clutch is disengaged, engagement of the jaw clutch may be effected without injurious effects on the differential. Thereupon, the engine clutch may be re-engaged to start the vehicle, this time with the differential locked up, since the jaw clutch will be engaged because the pedal 9 will be held down by the operator. As the clutch pedal 11 returns to its normal condition by operation of the spring loading in the clutch C, the lug 20, now in a position angularly spaced counterclockwise from the position shown in FIG. 1, would appear to impede return of the clutch pedal. However, the shapes of the cooperative portions of the stops 18 and 20 are such that the stop 18 can ride over the lug 20, stretching the spring 23 as it does so. In other words, the nose of the lug 20 will ride under the stop 18 and the clutch pedal 11 may be returned to its normal condition. After the adverse condition has been overcome, the pedal 9 may be released by the operator so that the jaw clutch J is disengaged under action of the spring 24, which is anchored to the tractor in any suitable fashion. As the pedal 9 returns to its FIG. 1 position, the lug 20 moves out from beneath the stop 18 and the stop returns to its FIG. 1 position under action of its spring 23. Thus, the jaw clutch 9 may be disengaged at the will of the operator, irrespective of the condition of the engine clutch control pedal 11. For example, when the tractor is being steered, it will be necessary to incur unlocking of the differential. Re-locking will of course require again disengaging the engine clutch C via the pedal 11.

As will be seen, the coordinating controls are of simple and inexpensive construction and may be readily applied to vehicles already equipped with differential and clutch control means as represented here by the pedals 9 and 11. The sequence of operation requires disengagement of the engine clutch before the jaw clutch can be engaged, thus giving the advantages already described. Other advantages will readily occur to those versed in the art, as will many modifications and alterations in the preferred embodiment disclosed, all of which may be achieved without departure from the spirit and scope of the invention.

What is claimed is:

1. In a vehicle having a power source and a pair of traction devices: a power train and control therefor comprising differential means of the selectively lockable and unlockable type interconnecting the traction devices; clutch means selectively engageable and disengageable to respectively interconnect and disconnect the power source and differential means; clutch control means movable between clutch-engaged and clutch-disengaged positions; differential control means movable between differential-unlocked and differential-locked positions; and coordinating mechanism operative between the two control means and so constructed and arranged as to require movement of the clutch control means to its clutch-disengaged condition before the differential control means can be moved to its differential-locked condition, said mechanism including cooperative one-way-overrunning elements enabling return of the clutch control means to its clutch-engaged position while the differential control means is in its differential-locked condition and further enabling subsequent return of the differential control means to its differential-unlocked position even though the clutch control means has been returned to its clutch-engaged position.

2. In a vehicle having a power source and a pair of traction devices: a power train and control therefor comprising differential means of the selectively lockable and unlockable type interconnecting the traction devices; clutch means selectively engageable and disengageable to respectively interconnect and disconnect the power source and differential means; clutch control means movable between clutch-engaged and clutch-disengaged positions and including a first rockable member; differential control means movable between differential-unlocked and differential-locked positions and including a second rockable member proximate to the first rockable member; and coordinating mechanism operative between the two control means and including lug means on the second member, a stop pivoted on the first member for movement both with and relative to said first member and biased to a first position, when the clutch control means is in its clutch-engaged position and the differential control means is in its differential-unlocked position, interposed in the path of movement of the lug means so as to prevent movement of the differential control means to its differential-locked position until said stop is moved out of said path by movement of the clutch control means to its clutch-disengaged position, said stop and lug means being so shaped and the biased condition of said stop being such that, upon return of the clutch control means to its clutch-engaged position while the differential control means is in its differential-locked position, the stop will override the lug means and so that upon return of the differential control means to its differential-unlocked position lug ratchets past the stop and enables said stop to return to its said first position in the path of said lug means.

3. In a vehicle having a power source, traction devices interconnected by a selectively lockable and unlockable differential means and clutch means selectively engageable and disengageable between the power source and the differential means, the improvement residing in control mechanism for the clutch and differential means, comprising: a first element connected to the clutch means and movable between first and second positions respectively according to engagement and disengagement of the clutch means, a second element connected to the differential means and movable between first and second positions respectively according to unlocking and locking of the differential means, said elements being arranged in an initial condition in which the first-positioned first element operates to block movement of the second element from its first position to its second position so as to prevent locking of the differential means while the clutch means is engaged, said first element in its second position unblocking said second element for movement thence to its second position upon locking of the differential means, said elements being operative to enable the first element to pass the second-positioned second element upon return of said first element to its first position when the clutch means is reengaged while the differential means remains locked, said returned first element being disposed at least partly in the path of return movement of the second element to its first position, and one of said elements including one-way yielding means enabling displacement of one element relative to the other upon return movement of the second element when the differential means is again unlocked, said yielding means being then operative to restore the aforesaid condition of the elements in which the first positioned first element blocks movement of the first-positioned second element.

References Cited in the file of this patent

UNITED STATES PATENTS

| 1,063,001 | Alden | May 27, 1913 |
| 1,174,778 | Trego | Mar. 7, 1916 |
| 1,938,848 | Matthews | Dec. 12, 1933 |